United States Patent
Dingler

[11] 3,833,261
[45] Sept. 3, 1974

[54] DUMPING ACCESSORY FOR PICK-UP TRUCKS AND THE LIKE

[76] Inventor: Tony Howard Dingler, 13596 Boone Rd., Columbia Station, Ohio 44028

[22] Filed: Mar. 27, 1972

[21] Appl. No.: 238,306

[52] U.S. Cl............... 298/1 A, 298/22 P, 298/22 R
[51] Int. Cl............................................. B60p 1/64
[58] Field of Search ...... 298/1 A, 22 C, 22 R, 22 P; 296/39 R

[56] References Cited
UNITED STATES PATENTS

| | | | |
|---|---|---|---|
| 1,259,138 | 3/1918 | Sachs | 296/39 R |
| 2,033,209 | 3/1936 | Teetor | 298/1 A |
| 2,684,864 | 7/1954 | Anthony | 298/1 A |
| 2,833,556 | 5/1958 | Kling | 298/22 C |
| 2,847,945 | 8/1958 | Merritt | 298/22 C |
| 2,911,253 | 11/1959 | Dewey | 296/39 R |
| 3,019,054 | 1/1962 | Stahly | 298/22 P |
| 3,695,710 | 10/1972 | Cresci | 298/22 C |

FOREIGN PATENTS OR APPLICATIONS

| | | | |
|---|---|---|---|
| 827,913 | 2/1960 | Great Britain | 298/22 C |
| 872,163 | 3/1953 | Germany | 298/22 C |

Primary Examiner—Robert S. Ward, Jr.
Assistant Examiner—Reinhard J. Eisenzopf
Attorney, Agent, or Firm—Cain and Lobo

[57] ABSTRACT

Portable apparatus for converting a flat-bed pick-up truck, and the like, to a dump truck including a support frame, a dump body or container detachably and rotatably hinged at the outer end to the frame, and a pair fo spaced hydraulic cylinders or lifters interconnecting the dump body and the frame at their non-hinged ends to raise the inner end of the body to dump its contents, together with improved hydraulic and electrical circuits for operating and controlling operation of the hydraulic cylinders and preventing damage to the accessory of the truck and improved means for holding the accessory in position within and on the truck body.

2 Claims, 8 Drawing Figures

DUMPING ACCESSORY FOR PICK-UP TRUCKS AND THE LIKE

BACKGROUND OF THE INVENTION

1. Field of the Invention

This invention relates to improvements in dumping apparatus and, more particularly, to improvements in apparatus for use with a vehicle, such as pick-up truck, having a flat-bed, to provide a removable dumping facility thereupon.

2. Description of the Prior Art

Various apparatus for use in converting a non-dumping vehicle, such as a pick-up, flat-bed or other type of truck, into a dump truck, have been proposed, used and/or disclosed in the prior art. Most such apparatus has been designed primarily for use on pick-up trucks, but may be useful on other flat-bed type trucks and vehicles as well. The prior art devices have presented problems which have prevented widespread adoption and use. For example, most available prior art devices are intended for permanent or semipermanent installation and frequently may be removed only with damage to the truck or its bed, and such devices often require a material alteration of the truck onto which they are mounted.

Devices of this nature have been suggested which may be removed from the pick-up bed, but many of these use retaining hooks or plates, which are permanently attached to the truck and interfere, or tend to interfere, with the normal usefulness of the original flat-bed.

Furthermore, many devices for converting a pick-up truck to a dump truck present difficulties to the ultimate user either because the attachment body damages the truck tail gate, or if the tail gate is removed in favor of a gate on the attachment, it is lost or misplaced and not available for remounting when the dumping body is removed.

SUMMARY OF THE INVENTION

It is, therefore a general object of this invention to provide new and improved apparatus for use on a pick-up, flat-bed, or other nondumping trucks and the like, to convert the same to a dump truck.

It is another object of this invention to provide new and improved apparatus which may be easily and temporarily installed onto a flat-bed vehicle such as a pick-up truck to provide a dumping facility therefor, and which may be readily removed therefrom when reconversion of the vehicle to its original purpose is desired.

A further object of this invention is to provide new and improved apparatus as an accessory for flat-bed pick-up trucks, and the like, which converts the truck to a dump truck and which utilizes the existing tail gate of the truck but which is inoperable when the tail gate is closed to prevent damage thereto.

Still further objects of this invention include the provision of a new and improved accessory dumping apparatus for pick-up and other flat-bed trucks which is economically manufactured and used; which requires no modification, change, or damage to the truck body either when being mounted, demounted or used, albeit a through-the-truck-body electrical connection can be provided, if desired; which requires only electrical interconnection with the truck upon which it is to be mounted to provide a functional unit; which is easily separated into a plurality of parts or portions for easy handling during mounting and demounting; which includes means for interacting with the truck body, without attachment thereto, for preventing tipping or other such motion of the dumping accessory as a whole, as opposed to lifting or tipping of the dumping body per se, during unloading; which can lift heavy loads within the capacity of the pick-up truck upon which it is mounted; which includes two spaced lifting cylinders and has means whereby the cylinders (lift) is maintained even though the load be unbalanced during dumping; which is self-contained, so that all the parts and portions necessary for operation are included in and as a part of the accessory; which only needs at best an electrical source or connection to function and which can be modified to include the electrical source if desired; which is self-contained including a supporting frame, dump body and operating mechanism but is separable to facilitate mounting and demounting; which includes means operable from the rear of the truck to permit lowering of the dump body after employing; and which may be provided with means to positively lower the truck body, may utilize gravity for such purpose or may include means biasing the dump body to a lowered position to facilitate lowering thereof.

Another object of this invention is to provide a new and improved accessory dumping apparatus for pick-up trucks and the like, obtaining one or more of the objects and advantages set forth above.

These and other objects, features, and advantages of this invention will become apparent to those skilled in the art from the following detailed description of a preferred embodiment thereof when read in conjunction with the accompanying drawing.

BRIEF DESCRIPTION OF THE DRAWING

The invention is illustrated in the accompanying drawing, wherein.

DETAILED DESCRIPTION OF THE PREFERRED EMBODIMENTS

Briefly, this invention comprises apparatus for use as an accessory upon a vehicle such as a pick-up truck, or the like, to provide a dumping facility thereupon. The apparatus includes a frame adapted to rest upon the flat bed and a dumping container rotatably hinged to the frame at its rearward end. Also included is hydraulic cylinder means interconnecting a front portion of the frame and a front portion of the container for raising the front portion of the container to dump the contents of the container. The invention also includes improved hydraulic and electrical circuits for operating the container and protecting the apparatus, the truck and the user.

Figure 1:
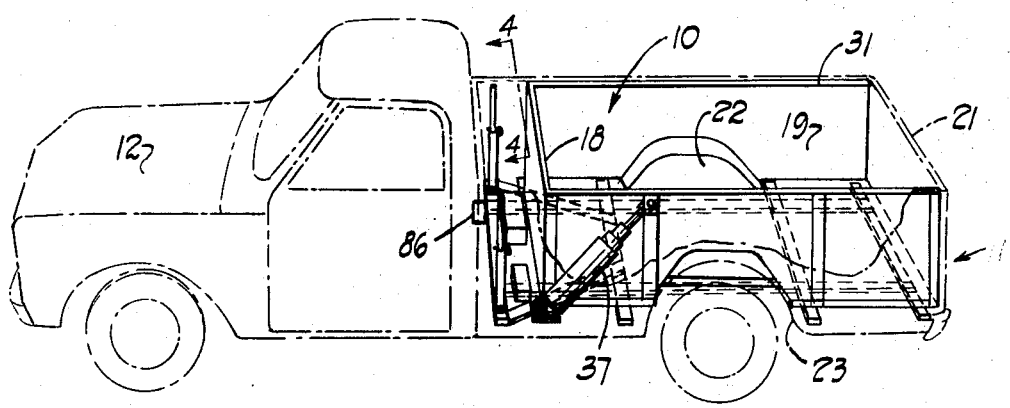
FIG. 1 is a perspective view of a pick-up truck, with the truck body partly broken away, having an accessory apparatus embodying a preferred form of this invention mounted thereon.

As shown in FIG. 1, an accessory dumping apparatus embodying this invention is indicated generally at 10, and is shown carried upon the bed 11 of a pick-up truck 12. For clarity of illustration, the near side of the pick-up truck bed has been partially broken away.

Figure 2:
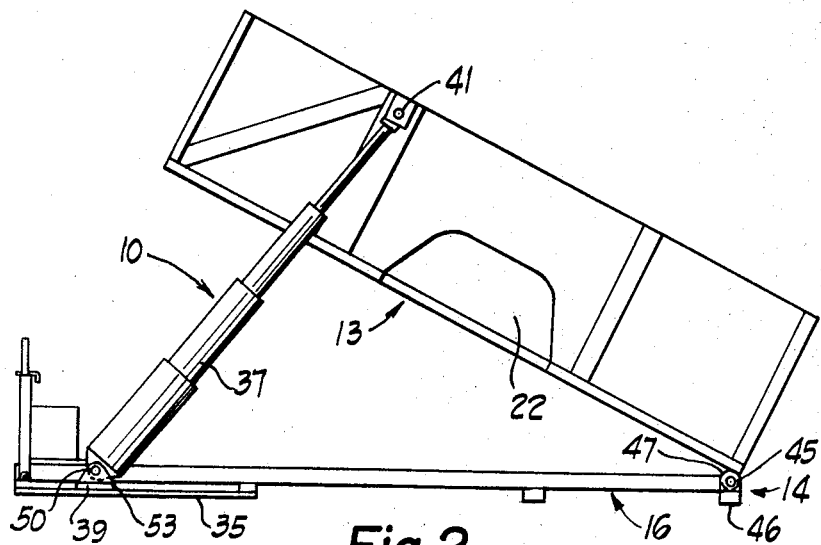
FIG. 2 is a side elevational view of an accessory dumping apparatus embodying a preferred form of this invention, showing the dump body in a raised position.

The dumping apparatus 10 includes a dumping container or body 13, FIG. 2, mounted by hinges 14 onto a support frame 16. The dumping container 13 includes three side walls 17, 18, and 19 and a bottom 20, FIG. 8. The back or rear side is omitted as its function is served by the existing rear tail gate 21 of the pick-up truck 12. As shown, the width of the dumping container 13 may be such as to allow it to be carried upon the pick-up bed 11 between the sides 17 and 19 and is provided with reliefs or cut-outs 22 in the walls 17 and 19 and bottom 20 to accommodate the wheel wells 23 of the truck bed 11.

Figure 8:
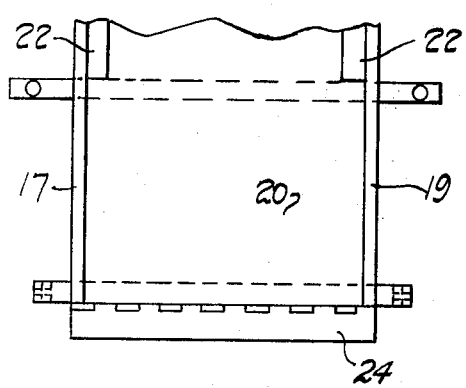
FIG. 8 is a broken top view showing the container of FIG. 2 with a flap thereon.

Since the dumping container 13 operates to dump its contents over the existing tail gate, if any, of the pick-up truck, a flap of rubber, fiber, or the like, 24, FIG. 8, of several inches width may be hinged along the rear edge of bottom 20 to prevent the contents of the container 13 from becoming lodged between the tail gate 21 and the pick-up bed 11 or under the bottom 20 of the container, if desired.

Figure 3:
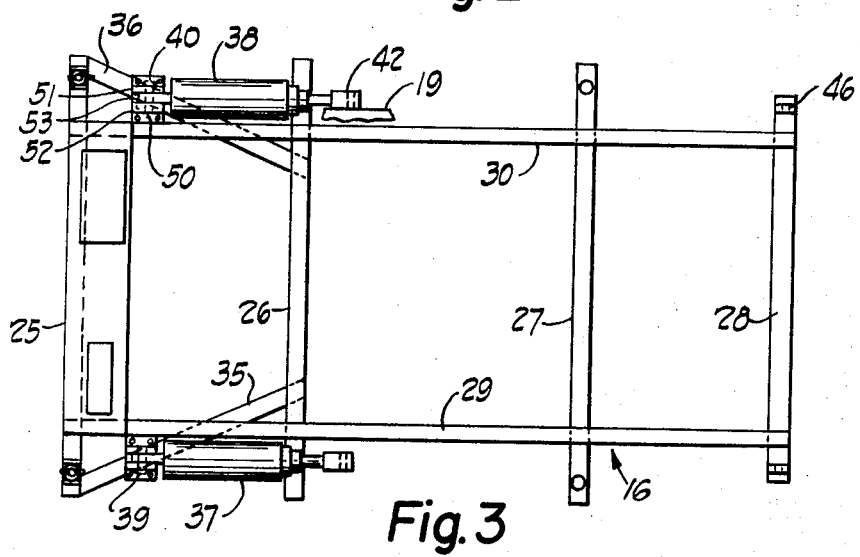
FIG. 3 is a top plan view of the frame member of an accessory dumping apparatus embodying this invention.

The support frame 16, of any durable material, such as wood, iron, steel, or the like, FIG. 3, may include four or more cross or transverse members 25, 26, 27 and 28, respectively, at least two of which are of a length about equal to the inside width of the pick-up bed 11 between sides 17 and 19. Frame 16 also includes two or more cross or longitudinal members 29 and 30, also of durable material, extending longitudinally across the members 25–28, inclusive, for substantially the inside length of the pick-up bed 11. The members 29 and 30 may be welded, bolted or otherwise affixed (welds or bolts not shown) to the members 25–28, respectively, at their interstices.

Figure 4:
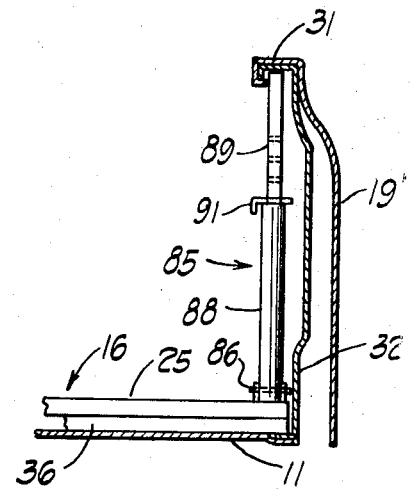
FIG. 4 is a broken sectional view taken along the line 4—4 of FIG. 1 and showing the use of the hold-down rods.

It should be pointed out that, in many pick-up designs, an interiorly extending lip 31 is provided upon the top of the pick-up bed walls on body 32, FIGS. 1 and 4. In such instances, the width of at least two of cross members 25–28, inclusive, is nonetheless preferably made substantially equal to the inside wall-to-wall distance of the bed and the frame is mounted by being tipped at an angle and inserting first one side and then the other.

Angular cross brace or reinforcing members 35 and 36 are provided between the forward cross member 25 and the adjacent cross member 26. In order to lift the container 13, at least one, but preferably two, telescoping hydraulic cylinders, motors or lifters 37 and 38, respectively, are rotatably mounted on and between the frame 16 and the container 13. More particularly, the cover ends of lifters 37 and 38 are mounted on frame 16 by hinges 39 and 40, respectively, which are, in turn, conveniently mounted on braces 35 and 36, respectively. At the other end, the hydraulic lifters 37 and 38 are rotatably fastened to the dumping container 13 by hinges 41 and 42, respectively, at a position rearwardly of hinges 39 and 40.

Each of the hinges 14 comprises a removable pin or pintle 45 extending within apertures on a base plate 46 on the cross member 28 and apertures in a plate 47 on the dumping container 13, thereby enabling rotational movement (see hinge 14 in FIG. 2), while at the same time permitting easy disassembly of the container 13 from the frame 16 so that the apparatus is easily handled and mounted within the truck. Note too that, whereas the frame 16 is of a width substantially equal to the inside distance between the basic vertical portions 32 of sides 17 and 19, FIG. 4, the width of the dumping container 13 is less so as to fit and be operable between the lips 31 of sides 17 and 19.

Also, the intermediate transverse braces 26 and 27 are preferably spaced apart longitudinally a distance substantially equal to the length of the wheel wells 23 so as to aid in preventing longitudinal shifting of the apparatus 10 while it is mounted on the truck.

Likewise, each of the hinges 39 and 40, inclusive, includes a pin 50 extending between two upstanding plates 51 and 52, mounted on braces 35 and 36, respectively, and a rod 53 carried on the hydraulic lifter.

In order to operate and control the hydraulic lifters 37 and 38 and, therefore, the dumping container 13, this invention also includes hydraulic and electric circuits and components. The hydraulic circuit, shown diagrammatically in FIG. 5 at 59, includes an electric motor 60 to operate a hydraulic pump 61 to pump fluid via line 62 from the sump or supply tank 63 through check valve 64 to the hydraulic line 65.

Line 65 is connected downstream of the check valve 64 via line 66 with the sump or tank 63 and via lines 67 and 68 with the hydraulic cylinders 37 and 38, respectively.

A solenoid operated directional valve 69 is disposed in line 66 and is adapted to close line 67 so that the hydraulic fluid is directed into the cylinders when the pump is operating and lifting is desired.

The valve 69 is operated to open line 67 and release the fluid from cylinders 37 and 38 whenever it is desired to lower the dump body. In such instances, the pump is normally deactivated and the weight of the body is sufficient to force the fluid out of the cylinders and into the sump, with line 67 open, to permit the body to lower.

Alternately, if valve 69 is opened while pump 61 is operating the fluid will simply recycle to the sump since line 67 operates against a no-load or zero head condition.

Check valve 64 prevents returning fluid, under the pressure created by the descending body 13, from damaging the sump and/or motor.

The hydraulic system also preferably includes a line 70, which, in effect, shunts valve 69 and is controlled by a manual valve 71 so that the dump body may be released manually should valve 69 or the power fail when the body is in a raised position. Valve 71 is conveniently operated by a rod 72, or the like, which extends to the rear to frame 16 where it may be reached easily by the user.

Figure 6:
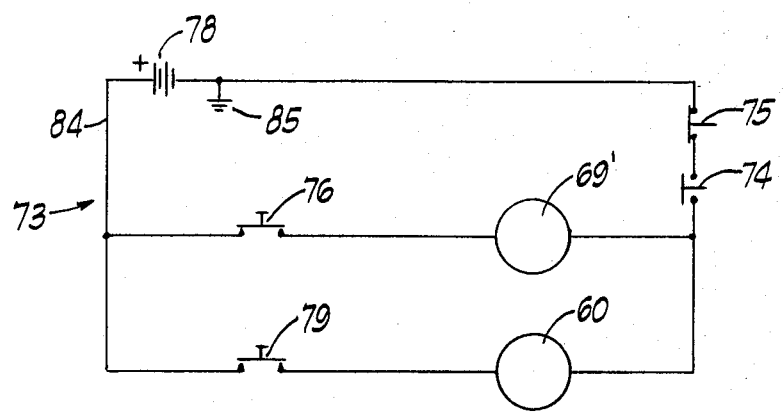
FIG. 6 is a wiring circuit for the electrical system for a dumping apparatus embodying a preferred form of this invention.

The electrical circuit 73 is shown schematically in FIG. 6 and includes, in series connection, two limit switches, one, 74, which is normally open, and one, 75, which is normally closed, the solenoid 69' of valve 69, a normally open "down" switch 76, and a battery 78 which conveniently may be the battery of the vehicle in conjunction with which the apparatus is used. Connected in parallel with solenoid 69' and switch 76 is the motor 60 connected in series with a normally open "up" switch 79. The terms "up" and "down" refer to the direction of movement of the container in the dumping and generally horizontal positions respectively. The limit switches 74 and 75 are physically positioned on apparatus 10 to be operated, respectively, by the pick-up tail gate 21, and one of the hydraulic lifters 37 or 38. Thus, normally open limit switch 74, for example, is closed when the tail gate is opened and is open when the tail gate is closed. This prevents the dumping container 13 from being inadvertently operated with the tail gate closed.

Likewise, normally closed limit switch 75 is opened when hydraulic lifter 37, for example, is fully extended to open the circuit and stop operation of the motor and pump.

When both limit switches 74 and 75 are closed and switch 79 is operated to close the same, the battery voltage is applied through said switches 74 and 75 to the pump motor 60, which operates the pump 61, to apply hydraulic fluid through check valve 64 to operate and extend the lifters 37 and 38. The dumping container 13 is then raised from its normal position, shown in FIG. 1, to its extended position, shown in FIG. 2.

When the normally open "down" switch 76 is closed, the solenoid 69' functions to open valve 69. The hydraulic fluid in the cylinders 37 and 38 then returns to the reservoir 63, via the respective lines 67 and 68 and lines 65 and 66, and the dumping container 13 is allowed to return to its normal position, shown in FIG. 1. This same action occurs, except that valve 69 is shunted, if valve 71 is opened manually.

Figure 5:
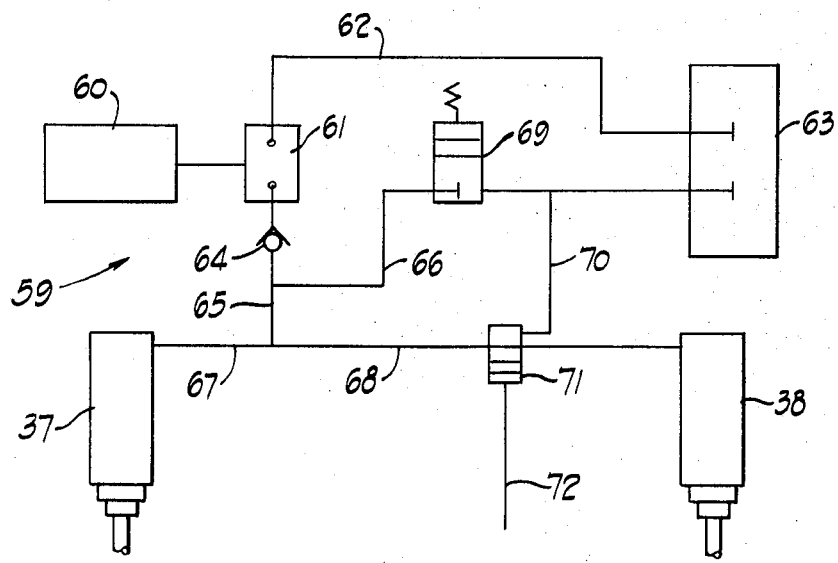
FIG. 5 is a schematic drawing of a hydraulic system suitable for use with a dumping apparatus embodying a preferred form of this invention.

As noted above, the cylinders in the hydraulic system shown in FIG. 5 lower under the influence of gravity acting upon the container 13 and the fact that the fluid is returned against a zero or no-load head.

Alternately, the container 13 may be urged downwardly or at least have its downward movement initiated more easily by a spring disposed between the container and the frame.

Figure 7:
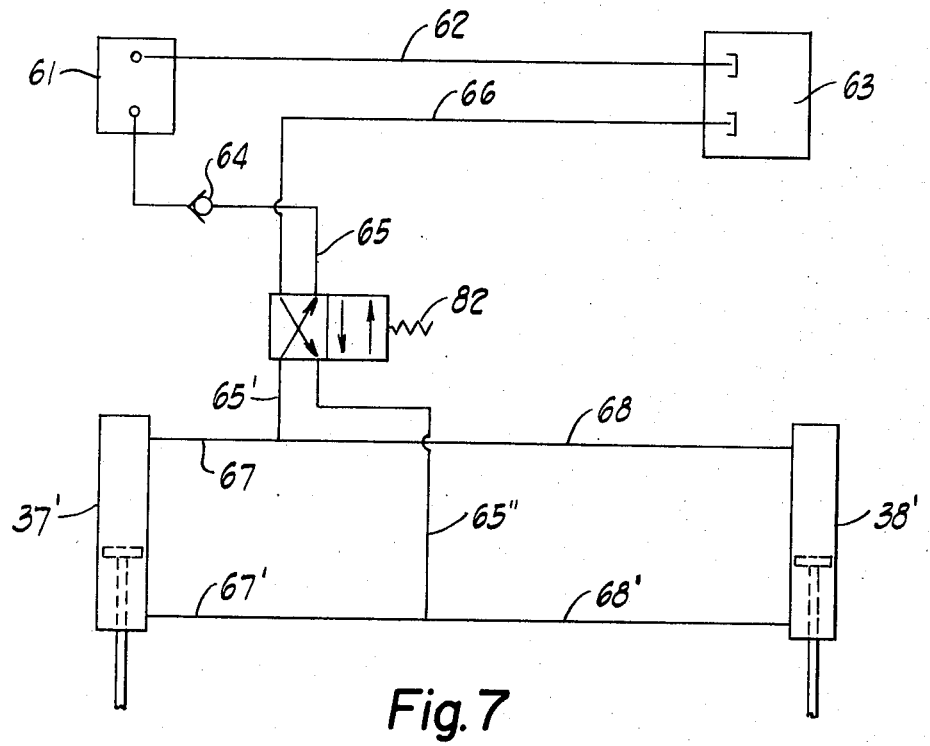
FIG. 7 is a schematic drawing of another hydraulic system suitable for use with a dumping apparatus embodying this invention.

A still further alternative is to provide doubleacting cylinders, indicated schematically at 37' and 38' in FIG. 7, with appropriate hydraulic lines 65, 65', 65'', 67, 67', 68 and 68' connecting the pump 61 with both ends, respectively, of each lifter 37' and 38' so that the cylinders are pumped, both up and down positively. In this instance, control of fluid flow in the respective lines is effected by a solenoid-operated bi-directional valve 82. In the position shown in FIG. 7, the valve 82 causes the fluid coming from the pump to flow through lines 65, 65' and 67 and 68 to the lower side of lifters 37' and 38', respectively, while returning fluid flows through lines 67' and 68' to line 65'' and thence line 66 to the sump, thereby lifting the container 13.

When the valve 82 is shifted, the connection from the pump 61 is via lines 65 and 65'' to lines 67' and 68' and the top of the respective lifters and from lines 67 and 68 to line 65' and 66 to the sump, thereby lowering the container 13.

Further, since, as indicated above, the battery may be the vehicle battery, it is to be understood that the wire 84, FIG. 6, could be a lead for connection to or with the vehicle battery, and the ground 85 could be effected either by an independent connector or through the metallic parts of the apparatus 10 and the truck in a manner well known in the art.

Switches 76 and 79 are preferably mounted in a suitable box 86 which is supported at a convenient and safe location, as by hanging on the side wall 17' of the truck body in FIG. 1, or within the cab, etc.

Apparatus 10 also preferably includes means whereby an interaction or reaction between the accessory apparatus 10 and the truck 12 prevents tipping of the entire apparatus as opposed to the dumping container 13, when the apparatus is mounted in the bed 11, since no bolts or hold-down clamps, or the like, carried on the truck bed are used with the preferred form of apparatus embodying this invention.

Such means conveniently comprises a plurality of hold-down rods, indicated generally at 85, FIG. 4, which are adapted to bear upon the frame 16 and the underside of the lip 31 of sides 17' and 19', respectively, of the truck bed 11.

For convenience, each rod 85 is pivotally secured to an end of cross member 25 of frame 16, as at 86, so as to underlie the lip 31 of the adjacent side, 17' or 19' of truck bed 11. Rod 85 is formed of two telescoping parts 88 and 89 so as to be adjustable for any height side wall, on the one hand, and to ensure desired contact, after vertical positioning, on the other hand.

Rod 85 also includes means to lock the parts 88 and 89 in their extended position. Such means, may comprise, for example, a series of apertures in the upper rod 89 through which a bolt 91 is positioned to serve as a seat to support the upper rod 89 on the top of the lower rod.

Also, the apparatus 10 is so designed that a space is provided on the frame 16 forwardly, leftwardly as viewed in FIG. 1, of the container 13 so that the components (motor, pump, sump and battery, if included) may all be carried and supported thereat for ease and convenience of mounting and servicing. Further, while the pump, motor, sump, etc., have been described as separate components, they may, of course, be provided as a single, multi-purpose element, in a manner known to the art.

The important matter is that the apparatus be a unitary whole, which, however, may be easily separated at the hinges between container and frame and lifters and container, so that the apparatus is easily handled for mounting and demounting, all without damage or change to the truck or apparatus either during mounting or demounting or during use.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. Apparatus, for use upon a vehicle having a flat bed portion and side wall means to provide a dumping facility, comprising a unitary rigid frame removably disposable upon said flat bed of the vehicle, a container rotatably hinged to said frame near a rearward end thereof, a pair of oppositely disposed, similarly directed, hydraulically actuated lifting means or lifters, each having one end pivotally demountably disposed on a front portion of said frame and the other end pivotally demountably disposed on a sidewall of said container near the front thereof, supply means for supplying fluid to and conducting fluid from said lifting means, thereby rotating said container to dump its contents, telescoping means, mounted on said front portion of said frame and extendable to engage said side wall means of said vehicle to prevent tipping of said apparatus as a whole, and holding means to hold said telescoping means in an extended position.

2. The apparatus according to claim 1 mounted on a truck having a flat bed and side wall means with said telescoping means engaging said side wall means.

* * * * *